(12) United States Patent  
Gadawski et al.

(10) Patent No.: US 8,399,118 B2
(45) Date of Patent: Mar. 19, 2013

(54) BATTERY MODULE AND METHOD FOR COOLING THE BATTERY MODULE

(75) Inventors: Thomas J. Gadawski, Shelby Township, MI (US); Josh Payne, Royal Oak, MI (US)

(73) Assignee: LG Chem, Ltd., Seoul (KR)

(*) Notice: Subject to any disclaimer, the term of this patent is extended or adjusted under 35 U.S.C. 154(b) by 488 days.

(21) Appl. No.: 12/511,530

(22) Filed: Jul. 29, 2009

(65) Prior Publication Data

US 2011/0027640 A1  Feb. 3, 2011

(51) Int. Cl.
*H01M 10/50* (2006.01)
(52) U.S. Cl. ....................................... 429/120
(58) Field of Classification Search ............ 429/120
See application file for complete search history.

(56) References Cited

U.S. PATENT DOCUMENTS

| | | |
|---|---|---|
| 2,273,244 A | 2/1942 | Cornelius |
| 2,391,859 A | 1/1946 | Earl |
| 3,503,558 A | 3/1970 | Galiulo et al. |
| 3,522,100 A | 7/1970 | Lindstrom |
| 3,550,681 A | 12/1970 | Stier et al. |
| 3,964,930 A | 6/1976 | Reiser |
| 4,063,590 A | 12/1977 | Mcconnell |
| 4,298,904 A | 11/1981 | Koenig |
| 4,322,776 A | 3/1982 | Job et al. |
| 4,390,841 A | 6/1983 | Martin et al. |
| 4,518,663 A | 5/1985 | Kodali et al. |
| 4,646,202 A | 2/1987 | Hook et al. |
| 4,701,829 A | 10/1987 | Bricaud et al. |
| 4,777,561 A | 10/1988 | Murphy et al. |
| 4,849,858 A | 7/1989 | Grapes et al. |
| 4,995,240 A | 2/1991 | Barthel et al. |
| 5,057,968 A | 10/1991 | Morrison |
| 5,071,652 A | 12/1991 | Jones et al. |
| 5,214,564 A | 5/1993 | Metzler et al. |

(Continued)

FOREIGN PATENT DOCUMENTS

| | | |
|---|---|---|
| EP | 1577966 A | 9/2005 |
| EP | 1852925 A | 11/2007 |

(Continued)

OTHER PUBLICATIONS

U.S. Appl. No. 12/511,552, filed Jul. 29, 2009 entitled Battery Module and Method for Cooling the Battery Module.

(Continued)

*Primary Examiner* — Ula C Ruddock
*Assistant Examiner* — Frank Chernow
(74) *Attorney, Agent, or Firm* — Buckert Patent & Trademark Law Firm, P.C.

(57) ABSTRACT

A battery module and a method for cooling the battery module are provided. The battery module includes a first battery cell and a cooling fin disposed adjacent to the first battery cell. The cooling fin has first and second headers, an extruded housing, and a flow diverter. The first and second headers are coupled to first and second ends, respectively, of the extruded housing. The extruded housing has a first plurality of flow channels and a second plurality of flow channels extending therethrough that fluidly communicate with the first and second headers. The flow diverter is disposed in the first header to induce a fluid to flow from the first header through the first plurality of flow channels in the extruded housing to the second header to extract heat energy from the first battery cell.

12 Claims, 6 Drawing Sheets

U.S. PATENT DOCUMENTS

| | | | |
|---|---|---|---|
| 5,270,131 A | 12/1993 | Diethelm et al. | |
| 5,322,745 A | 6/1994 | Yanagihara et al. | |
| 5,329,988 A | 7/1994 | Juger | |
| 5,346,786 A | 9/1994 | Hodgetts | |
| 5,356,735 A | 10/1994 | Meadows et al. | |
| 5,510,203 A | 4/1996 | Hamada et al. | |
| 5,606,242 A | 2/1997 | Hull et al. | |
| 5,652,502 A | 7/1997 | Van Phuoc et al. | |
| 5,658,682 A | 8/1997 | Usuda et al. | |
| 5,663,007 A | 9/1997 | Ikoma et al. | |
| 5,736,836 A | 4/1998 | Hasegawa et al. | |
| 5,756,227 A | 5/1998 | Suzuki et al. | |
| 5,796,239 A | 8/1998 | Van Phuoc et al. | |
| 5,825,155 A | 10/1998 | Ito et al. | |
| 5,937,664 A | 8/1999 | Matsuno et al. | |
| 5,982,403 A | 11/1999 | Inagaki | |
| 6,016,047 A | 1/2000 | Notten et al. | |
| 6,087,036 A | 7/2000 | Rouillard et al. | |
| 6,111,387 A | 8/2000 | Kouzu et al. | |
| 6,176,095 B1 | 1/2001 | Porter | |
| 6,344,728 B1 | 2/2002 | Kouzu et al. | |
| 6,353,815 B1 | 3/2002 | Vilim et al. | |
| 6,362,598 B2 | 3/2002 | Laig-Horstebrock et al. | |
| 6,399,238 B1 | 6/2002 | Oweis et al. | |
| 6,441,586 B1 | 8/2002 | Tate, Jr. et al. | |
| 6,462,949 B1 | 10/2002 | Parish, IV et al. | |
| 6,512,347 B1 | 1/2003 | Hellmann et al. | |
| 6,515,454 B2 | 2/2003 | Schoch | |
| 6,534,954 B1 | 3/2003 | Plett | |
| 6,563,318 B2 | 5/2003 | Kawakami et al. | |
| 6,569,556 B2 | 5/2003 | Zhou et al. | |
| 6,662,891 B2 | 12/2003 | Misu et al. | |
| 6,689,510 B1 | 2/2004 | Gow et al. | |
| 6,696,197 B2 | 2/2004 | Inagaki et al. | |
| 6,724,172 B2 | 4/2004 | Koo | |
| 6,750,630 B2 | 6/2004 | Inoue et al. | |
| 6,775,998 B2 | 8/2004 | Yuasa et al. | |
| 6,780,538 B2 | 8/2004 | Hamada et al. | |
| 6,821,671 B2 | 11/2004 | Hinton et al. | |
| 6,826,948 B1 | 12/2004 | Bhatti et al. | |
| 6,829,562 B2 | 12/2004 | Sarfert | |
| 6,832,171 B2 | 12/2004 | Barsoukov et al. | |
| 6,876,175 B2 | 4/2005 | Schoch | |
| 6,878,485 B2 | 4/2005 | Ovshinsky et al. | |
| 6,892,148 B2 | 5/2005 | Barsoukov et al. | |
| 6,927,554 B2 | 8/2005 | Tate, Jr. et al. | |
| 6,943,528 B2 | 9/2005 | Schoch | |
| 6,967,466 B2 | 11/2005 | Koch | |
| 6,982,131 B1 | 1/2006 | Hamada et al. | |
| 7,012,434 B2 | 3/2006 | Koch | |
| 7,039,534 B1 | 5/2006 | Ryno et al. | |
| 7,061,246 B2 | 6/2006 | Dougherty et al. | |
| 7,070,874 B2 | 7/2006 | Blanchet et al. | |
| 7,072,871 B1 | 7/2006 | Tinnemeyer | |
| 7,098,665 B2 | 8/2006 | Laig-Hoerstebrock | |
| 7,109,685 B2 | 9/2006 | Tate, Jr. et al. | |
| 7,126,312 B2 | 10/2006 | Moore | |
| 7,143,124 B2 | 11/2006 | Garthwaite | |
| 7,147,045 B2 | 12/2006 | Quisenberry et al. | |
| 7,150,935 B2 | 12/2006 | Hamada et al. | |
| 7,197,487 B2 | 3/2007 | Hansen et al. | |
| 7,199,557 B2 | 4/2007 | Anbuky et al. | |
| 7,250,741 B2 | 7/2007 | Koo et al. | |
| 7,251,889 B2 | 8/2007 | Kroliczek et al. | |
| 7,253,587 B2 | 8/2007 | Meissner | |
| 7,264,902 B2 | 9/2007 | Horie et al. | |
| 7,278,389 B2 | 10/2007 | Kirakosyan | |
| 7,315,789 B2 | 1/2008 | Plett | |
| 7,321,220 B2 | 1/2008 | Plett | |
| 7,327,147 B2 | 2/2008 | Koch | |
| 7,467,525 B1 | 12/2008 | Ohta et al. | |
| 7,531,270 B2 | 5/2009 | Buck et al. | |
| 7,795,845 B2 | 9/2010 | Cho | |
| 7,797,958 B2 | 9/2010 | Alston et al. | |
| 7,816,029 B2 | 10/2010 | Takamatsu et al. | |
| 7,846,573 B2 * | 12/2010 | Kelly | 429/120 |
| 7,879,480 B2 | 2/2011 | Yoon et al. | |
| 7,883,793 B2 | 2/2011 | Niedzwiecki et al. | |
| 7,976,978 B2 | 7/2011 | Shin et al. | |
| 7,981,538 B2 | 7/2011 | Kim et al. | |
| 7,997,367 B2 | 8/2011 | Nakamura | |
| 8,007,915 B2 | 8/2011 | Kurachi | |
| 8,030,886 B2 | 10/2011 | Mahalingam et al. | |
| 8,067,111 B2 | 11/2011 | Koetting et al. | |
| 2001/0035739 A1 | 11/2001 | Laig-Horstebrock et al. | |
| 2002/0130637 A1 | 9/2002 | Schoch | |
| 2002/0169581 A1 | 11/2002 | Sarfert | |
| 2002/0182493 A1 | 12/2002 | Ovshinsky et al. | |
| 2003/0052690 A1 | 3/2003 | Schoch | |
| 2003/0184307 A1 | 10/2003 | Kozlowski et al. | |
| 2003/0211384 A1 | 11/2003 | Hamada et al. | |
| 2004/0000892 A1 | 1/2004 | Jae-Seung | |
| 2004/0032264 A1 | 2/2004 | Schoch | |
| 2004/0189257 A1 | 9/2004 | Dougherty et al. | |
| 2005/0001627 A1 | 1/2005 | Anbuky et al. | |
| 2005/0026014 A1 | 2/2005 | Fogaing et al. | |
| 2005/0035742 A1 | 2/2005 | Koo et al. | |
| 2005/0046388 A1 | 3/2005 | Tate, Jr. et al. | |
| 2005/0089750 A1 | 4/2005 | Ng et al. | |
| 2005/0100786 A1 | 5/2005 | Ryu et al. | |
| 2005/0103486 A1 | 5/2005 | Demuth et al. | |
| 2005/0110460 A1 | 5/2005 | Arai et al. | |
| 2005/0127874 A1 | 6/2005 | Lim et al. | |
| 2005/0134038 A1 | 6/2005 | Walsh | |
| 2005/0194936 A1 | 9/2005 | Cho | |
| 2006/0097698 A1 | 5/2006 | Plett | |
| 2006/0100833 A1 | 5/2006 | Plett | |
| 2006/0111854 A1 | 5/2006 | Plett | |
| 2006/0111870 A1 | 5/2006 | Plett | |
| 2006/0234119 A1 | 10/2006 | Kruger et al. | |
| 2006/0286450 A1 | 12/2006 | Yoon et al. | |
| 2007/0035307 A1 | 2/2007 | Schoch | |
| 2007/0046292 A1 | 3/2007 | Plett | |
| 2007/0087266 A1 | 4/2007 | Bourke et al. | |
| 2007/0103120 A1 | 5/2007 | Plett | |
| 2007/0120533 A1 | 5/2007 | Plett | |
| 2007/0188143 A1 | 8/2007 | Plett | |
| 2007/0236182 A1 | 10/2007 | Plett | |
| 2008/0003491 A1 | 1/2008 | Yahnker et al. | |
| 2008/0041079 A1 | 2/2008 | Nishijima et al. | |
| 2008/0094035 A1 | 4/2008 | Plett | |
| 2008/0182151 A1 | 7/2008 | Mizusaki et al. | |
| 2008/0248338 A1 | 10/2008 | Yano et al. | |
| 2009/0029239 A1 | 1/2009 | Koetting et al. | |
| 2009/0087727 A1 * | 4/2009 | Harada et al. | 429/120 |
| 2009/0104512 A1 | 4/2009 | Fassnacht et al. | |
| 2009/0155680 A1 | 6/2009 | Maguire et al. | |
| 2009/0186265 A1 | 7/2009 | Koetting et al. | |
| 2009/0258288 A1 * | 10/2009 | Weber et al. | 429/120 |
| 2009/0280395 A1 * | 11/2009 | Nemesh et al. | 429/62 |
| 2009/0325052 A1 | 12/2009 | Koetting et al. | |
| 2009/0325054 A1 | 12/2009 | Payne et al. | |
| 2009/0325055 A1 | 12/2009 | Koetting et al. | |
| 2010/0112419 A1 | 5/2010 | Jang et al. | |
| 2010/0203376 A1 | 8/2010 | Choi et al. | |
| 2010/0209760 A1 | 8/2010 | Yoshihara et al. | |
| 2010/0262791 A1 | 10/2010 | Gilton | |
| 2010/0275619 A1 | 11/2010 | Koetting et al. | |
| 2010/0276132 A1 | 11/2010 | Payne | |
| 2010/0279152 A1 | 11/2010 | Payne | |
| 2010/0279154 A1 | 11/2010 | Koetting et al. | |
| 2011/0027640 A1 | 2/2011 | Gadawski et al. | |
| 2011/0041525 A1 | 2/2011 | Kim et al. | |
| 2011/0052959 A1 | 3/2011 | Koetting et al. | |
| 2012/0082880 A1 | 4/2012 | Koetting et al. | |

FOREIGN PATENT DOCUMENTS

| | | | |
|---|---|---|---|
| JP | 08111244 | | 4/1996 |
| JP | 09129213 | | 5/1997 |
| JP | 09219213 | | 8/1997 |
| JP | 2001105843 | A | 4/2001 |
| JP | 2002038033 | A | 2/2002 |
| JP | 2002319383 | A | 10/2002 |
| JP | 2003188323 | A | 7/2003 |
| JP | 2005126315 | A | 5/2005 |
| JP | 2005349955 | A | 12/2005 |
| JP | 2006139928 | A | 6/2006 |

| | | | |
|---|---|---|---|
| JP | 2007305425 A | 11/2007 | |
| JP | 2008054379 A | 3/2008 | |
| JP | 2008062875 A | 3/2008 | |
| JP | 2008080995 A | 4/2008 | |
| JP | 2008159440 A | 7/2008 | |
| JP | 2009009889 A | 1/2009 | |
| JP | 2009054297 A | 3/2009 | |
| KR | 20050092605 A | 9/2005 | |
| KR | 100637472 B1 | 10/2006 | |
| KR | 100765659 B1 | 10/2007 | |
| KR | 20080047641 A | 5/2008 | |
| KR | 20090082212 A | 7/2009 | |
| KR | 100921346 B1 | 10/2009 | |
| WO | 2006101343 A | 9/2006 | |
| WO | 2007007503 A | 1/2007 | |
| WO | 2007115743 A2 | 10/2007 | |
| WO | 2009073225 A | 6/2009 | |

OTHER PUBLICATIONS

U.S. Appl. No. 12/549,766, filed Aug. 28, 2009 entitled Battery Module and Method for Cooling the Battery Module.
U.S. Appl. No. 12/165,100, filed Jun. 30, 2008 entitled Battery Cell Assembly Having Heat Exchanger with Serpentine Flow Path.
U.S. Appl. No. 12/164,780, filed Jun. 30, 2008 entitled Battery Module Having Battery Cell Assembly with Heat Exchanger.
U.S. Appl. No. 12/164,627, filed Jun. 30, 2008 entitled Liquid Cooled Battery Manifold Assembly with Flow Balancing Feature.
U.S. Appl. No. 12/246,073, filed Oct. 6, 2008 entitled Battery Cell Carrier That Engages Side Walls of Active Cell.
U.S. Appl. No. 12/164,445, filed Jun. 30, 2008 entitled Battery Module Having a Rubber Cooling Manifold.
U.S. Appl. No. 12/258,696, filed Oct. 27, 2008 entitled Battery Module Having Cooling Manifold with Ported Screws and Method for Cooling the Battery Module.
U.S. Appl. No. 12/433,155, filed Apr. 30, 2009 entitled Cooling System for a Battery and a Method for Cooling the Battery System.
U.S. Appl. No. 12/433,427, filed Apr. 30, 2009 entitled Cooling Manifold and Method for Manufacturing the Cooling Manifold.
U.S. Appl. No. 12/433,534, filed Apr. 30, 2009 entitled Battery Systems, Battery Modules, and Method for Cooling a Battery Module.
U.S. Appl. No. 12/433,397, filed Apr. 30, 2009 entitled Battery Systems, Battery Modules, and Method for Cooling a Battery Module.
U.S. Appl. No. 12/164,741, filed Jun. 30, 2008 entitled Battery Module Having Battery Cell Assemblies with Alignment-Coupling Features.
U.S. Appl. No. 12/433,485, filed Apr. 30, 2009 entitled Battery Systems, Battery Module and Method for Cooling the Battery Module.
U.S. Appl. No. 12/426,795, filed Apr. 20, 2009 entitled Frame Member, Frame Assembly and Battery Cell Assembly Made Therefrom and Methods of Making the Same.
"Gasket". Merriam-Webster. Merriam-Webster. Web. May 30, 2012. <http://www.merriam-webster.com/dictionary/gasket>.

International Search Report; International Application No. PCT/KR2009/000258; International Filing Date: Jan. 16, 2009; Date of Mailing: Aug. 28, 2010; 2 pages.
International Search Report; International Application No. PCT/KR2009/003428; International Filing Date: Jun. 25, 2009; Date of Mailing: Jan. 22, 2010; 2 pages.
International Search Report; International Application No. PCT/KR2009/003429; International Filing Date: Jun. 25, 2009; Date of Mailing: Jan. 12, 2010; 3 pages.
International Search Report; International Application No. PCT/KR2009/003430; International Filing Date: Jun. 25, 2009; Date of Mailing: Feb. 3, 2010; 2 pages.
International Search Report; International Application No. PCT/KR2009/003434; International Filing Date: Jun. 25, 2009; Date of Mailing: Jan. 18, 2010; 2 pages.
International Search Report; International Application No. PCT/KR2009/003436; International Filing Date: Jun. 25, 2009; Date of Mailing: Jan. 22, 2010; 2 pages.
International Search Report; International Application No. PCT/KR2009/006121; International Filing Date: Oct. 22, 2009; Date of Mailing: May 3, 2010; 2 pages.
International Search Report; International Application No. PCT/KR2010/002334; International Filing Date: Apr. 15, 2010; Date of Mailing: Nov. 29, 2010; 2 pages.
International Search Report; International Application No. PCT/KR2010/002336; International Filing Date: Apr. 15, 2010; Date of Mailing: Jan. 31, 2011; 2 pages.
International Search Report; International Application No. PCT/KR2010/002337; International Filing Date: Apr. 15, 2010; Date of Mailing: May 3, 2010; 2 pages.
International Search Report; International Application No. PCT/KR2010/002340; International Filing Date: Apr. 15, 2010; Date of Mailing: Jan. 31, 2011; 2 pages.
International Search Report; International Application No. PCT/KR2010/004944; International Filing Date: Jul. 28, 2010; Date of Mailing: Apr. 29, 2011; 2 pages.
International Search Report; International Application No. PCT/KR2010/005639; International Filing Date: Aug. 24, 2010; Date of Mailing: Jun. 3, 2011; 2 pages.
Machine translation of Japanese Patent Application No. 2009-009889 A, published Jan. 15, 2009.
Thomas J. Gadawski et al., pending U.S. Appl. No. 13/433,649 entitled "Battery System and Method for Cooling the Battery System," filed with the U.S. Patent and Trademark Office on Mar. 29, 2012.
U.S. Appl. No. 13/475,963, filed May 19, 2012 entitled Battery Cell Assembly and Method for Manufacturing a Cooling Fin for the Battery Cell Assembly.

* cited by examiner

| 350 |
|---|
| HEAT ENERGY IS CONDUCTED FROM THE FIRST BATTERY CELL INTO A COOLING FIN, THE COOLING FIN HAVING FIRST AND SECOND HEADERS, AN EXTRUDED HOUSING, AND A FLOW DIVERTER |

↓

| 352 |
|---|
| FIRST HEADER RECEIVES A FLUID THAT IS DIVERTED BY THE FLOW DIVERTER IN THE FIRST HEADER THROUGH A FIRST PLURALITY OF FLOW CHANNELS IN THE EXTRUDED HOUSING TO THE SECOND HEADER TO EXTRACT HEAT ENERGY FROM THE COOLING FIN |

↓

| 354 |
|---|
| FLUID IS ROUTED FROM THE SECOND HEADER THROUGH A SECOND PLURALITY OF FLOW CHANNELS IN THE EXTRUDED HOUSING BACK TO THE FIRST HEADER THAT FURTHER EXTRACTS HEAT ENERGY FROM THE COOLING FIN |

BATTERY MODULE AND METHOD FOR COOLING THE BATTERY MODULE

TECHNICAL FIELD

This application relates to a battery module and a method for cooling the battery module.

BACKGROUND OF THE INVENTION

In a typical air-cooled battery pack, ambient air from ambient atmosphere is directed across battery cells in the battery pack and is subsequently exhausted from the battery pack. However, the typical air-cooled battery pack has a major challenge in maintaining a temperature of the battery pack within a desired temperature range.

In particular, a maximum operating temperature of the battery cells can often be less than a temperature of ambient air utilized to cool the batteries. In this situation, it is impossible to maintain the battery cells within a desired temperature range in an air-cooled battery pack.

Accordingly, the inventors herein have recognized a need for an improved battery module and a method for cooling the battery module that minimizes and/or eliminates the above-mentioned deficiency.

SUMMARY OF THE INVENTION

A battery module in accordance with an exemplary embodiment is provided. The battery module includes a first battery cell and a cooling fin. The cooling fin is disposed adjacent to the first battery cell. The cooling fin has first and second headers, an extruded housing, and a flow diverter. The first and second headers are coupled to first and second ends, respectively, of the extruded housing. The extruded housing has a first plurality of flow channels and a second plurality of flow channels extending therethrough that fluidly communicate with the first and second headers. The flow diverter is disposed in the first header to induce a fluid to flow from the first header through the first plurality of flow channels in the extruded housing to the second header to extract heat energy from the first battery cell. The flow diverter further induces the fluid to flow from the second header through the second plurality of flow channels in the extruded housing back to the first header to further extract heat energy from the first battery cell.

A method for cooling a battery module in accordance with another exemplary embodiment is provided. The battery module has a first battery cell and a cooling fin disposed adjacent to the first battery cell. The cooling fin has first and second headers, an extruded housing, and a flow diverter. The first and second headers are coupled to first and second ends, respectively, of the extruded housing. The extruded housing has a first plurality of flow channels and a second plurality of flow channels extending therethrough that fluidly communicate with the first and second headers. The flow diverter is disposed in the first header. The method includes conducting heat energy from the first battery cell into the cooling fin. The method further includes receiving a fluid into the first header that is diverted by a flow diverter in the first header through the first plurality of flow channels in the extruded housing to the second header to extract heat energy from the cooling fin. The method further includes routing the fluid from the second header through the second plurality of flow channels in the extruded housing back to the first header which further extracts heat energy from the cooling fin.

DETAILED DESCRIPTION OF EXEMPLARY EMBODIMENTS

Figure 1:
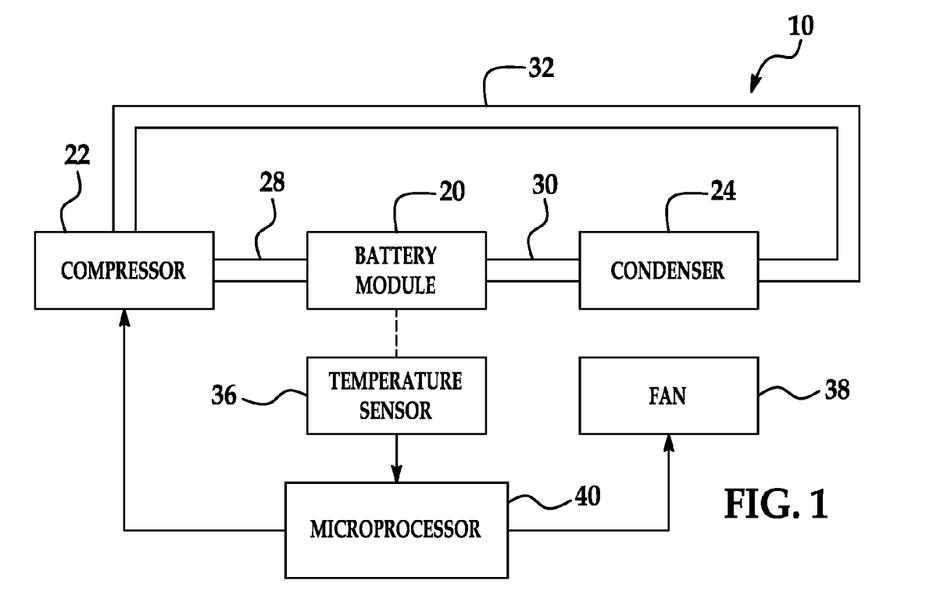
FIG. 1 is a schematic of a battery system having a battery module in accordance with an exemplary embodiment.

Referring to FIG. 1, a battery system 10 for generating electrical power in accordance with an exemplary embodiment is illustrated. The battery system 10 includes a battery module 20, a compressor 22, a condenser 24, conduits 28, 30, 32, a temperature sensor 36, a fan 38, and a microprocessor 40. An advantage of the battery module 20 is that the battery module utilizes cooling fins with extruded housings to transfer heat energy from battery cells to the cooling fins to effectively cool the battery cells. Further, an advantage of an extruded housing is that the extruded housing can be easily brazed or welded to two headers to more easily manufacture a cooling fin, as compared to other devices.

For purposes of understanding, the term "fluid" means either a liquid or a gas. For example, a fluid can comprise either a coolant or a refrigerant. Exemplary coolants include ethylene glycol and propylene glycol. Exemplary refrigerants include R-11, R-12, R-22, R-134A, R-407C and R-410A.

Figure 2:
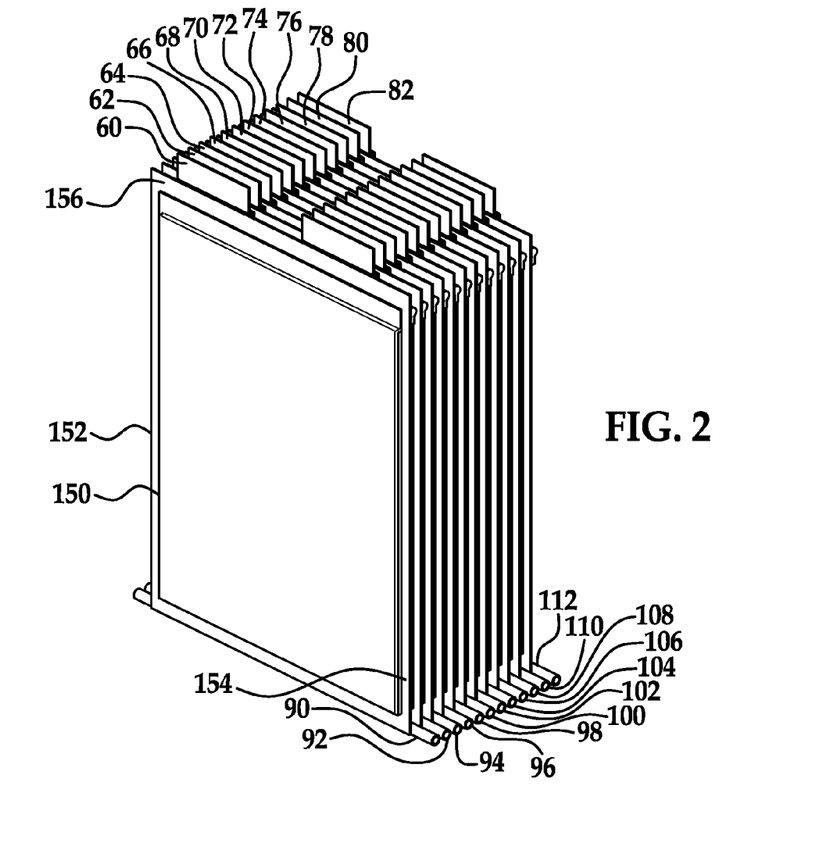
FIG. 2 is a schematic of the battery module utilized in the battery system of FIG. 1 in accordance with another exemplary embodiment.

Referring to FIGS. 1 and 2, the battery module 20 is provided to generate a voltage therein. The battery module 20 includes battery cells 60, 62, 64, 66, 68, 70, 72, 74, 76, 78, 80, 82 and cooling fins 90, 92, 94, 96, 98, 100, 102, 104, 106, 108, 110, 112.

The battery cells 60, 62, 64, 66, 68, 70, 72, 74, 76, 78, 80, 82 are provided to generate an electrical voltage. In particular, each of the battery cells has a substantially similar structure. For example, referring to battery cell 60, the battery cell includes a body portion 150, flange portions 152, 154, and electrodes 156, 158 extending upwardly from the body portion 150. The flange portions 152, 154 extend from first and second ends of the body portion 150. The electrodes 156, 158 have a voltage generated therebetween. The electrodes of the battery cells can be electrically coupled together either in series or in parallel depending upon a desired voltage and current of the battery module 20. In one exemplary embodiment, each battery cell is a lithium-ion battery cell. In alternative embodiments, the battery cells could be nickel-cadmium battery cells or nickel metal hydride battery cells for example. Of course, other types of battery cells known to those skilled in the art could be utilized.

The cooling fins 90, 92, 94, 96, 98, 100, 102, 104, 106, 108, 110, 112 are provided to conduct heat energy from the battery cells into the cooling fins. Each of the cooling fins has an inlet port fluidly coupled to the conduit 28. Further each of the cooling fans has an outlet port fluidly coupled to the conduit 30. The cooling fin 90 is disposed between the battery cells 60, 62, and the cooling fin 92 is disposed between the battery cells 62, 64. The cooling fin 94 is disposed between the battery cells 64, 66, and the cooling fin 96 is disposed between the battery cells 66, 68. The cooling fin 98 is disposed between the battery cells 68, 70, and the cooling fin 100 is disposed between the battery cells 70, 72. The cooling fin 102 is disposed between the battery cells 72, 74, and the cooling fin 104 is disposed between the battery cells 74, 76. The cooling fin 106 is disposed between the battery cells 76, 78, and the cooling fin 108 is disposed between the battery cells 78, 80. The cooling fin 108 is disposed between the battery cells 78, 80, and the cooling fin 110 is disposed between the battery cells 80, 82. Further, the cooling fin 112 is disposed adjacent to the battery cell 82. The cooling fins are constructed from at least one of aluminum and copper. During operation, the cooling fins are configured to receive a fluid from the compressor 22. The cooling fins conduct heat energy from the battery cells into the fluid flowing therethrough to cool the battery cells. In one exemplary embodiment, the fluid is a coolant such as ethylene glycol or propylene glycol for example. In another exemplary embodiment, the fluid is a refrigerant.

Figure 3:
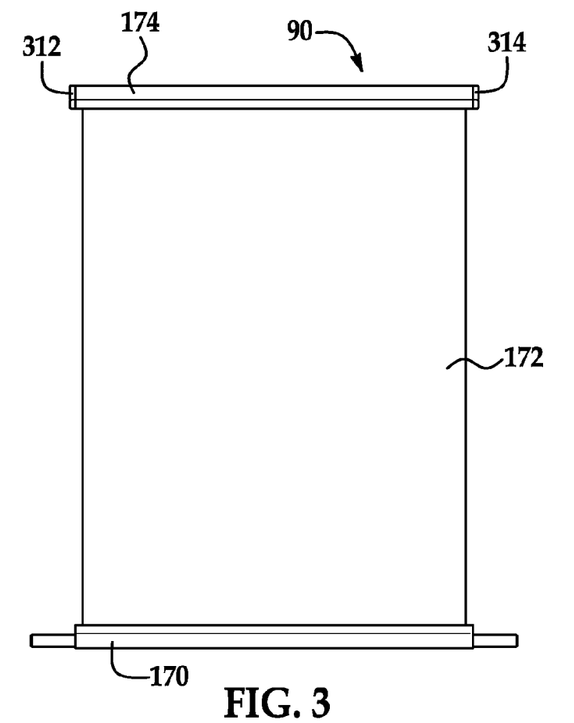
FIG. 3 is a schematic of a cooling fin utilized in the battery system of FIG. 1.
Figure 4:
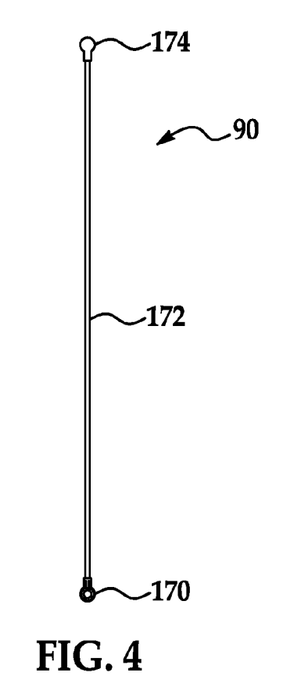
FIG. 4 is another schematic of the cooling fin of FIG. 3.
Figure 5:
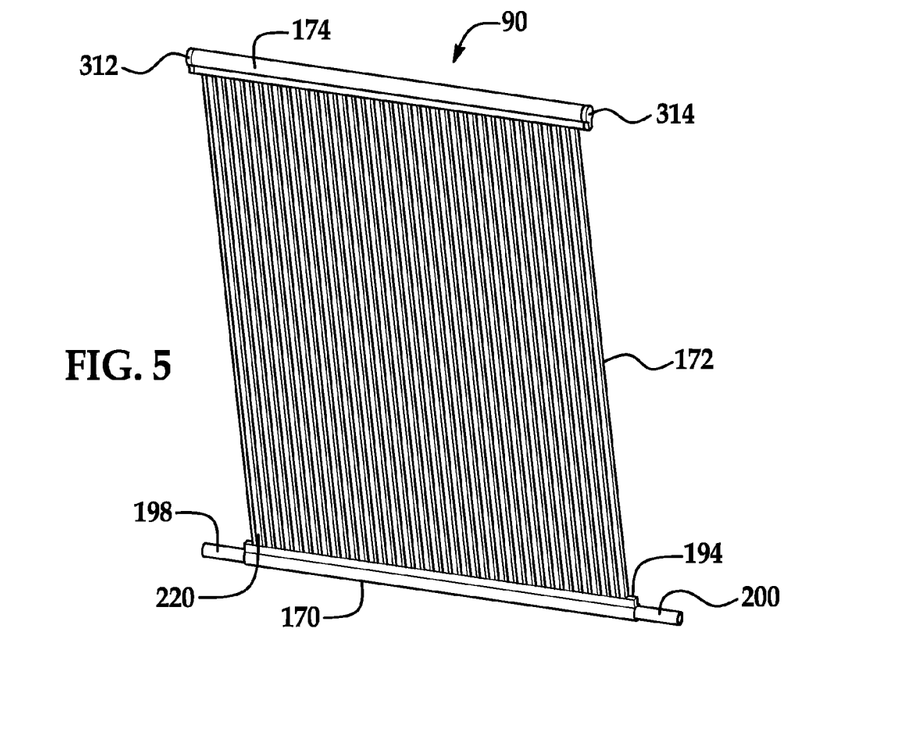
FIG. 5 is another schematic of the cooling fin of FIG. 3 illustrating the interior flow channels therein.

The structure of the cooling fins are identical to one another. Accordingly, only the structure of the cooling fin 90 will be explained in greater detail. Referring to FIGS. 3, 4 and 5, the cooling fan 90 includes a header 170, an extruded housing 172, and a header 174.

Referring to FIGS. 6 and 8-11, the header 170 includes a tubular portion 190, an extension portion 194, an inlet port 198, an outlet port 200, a flow diverter 202, and plugs 204, 206.

Figure 6:
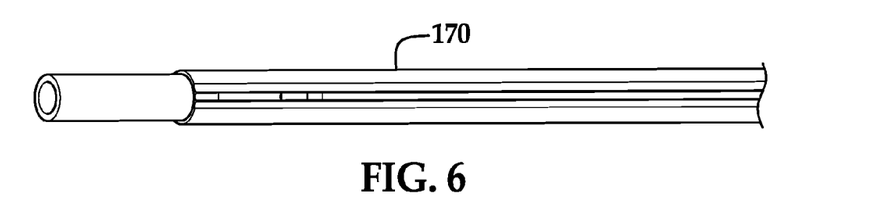
FIG. 6 is an enlarged schematic of a portion of a first header utilized in the cooling fin of FIG. 3.

The tubular portion 190 includes an interior region 207 extending therethrough and the extension portion 194 includes an interior region 208 extending therethrough. The extension portion 194 is coupled to the tubular portion 190 and has a substantially similar length as the tubular portion 190. Further, the interior region 207 of the tubular portion 190 communicates with the interior region 208 of the extension portion 194. Further, the tubular portion 190 and the extension portion 194 are constructed from at least one of copper and aluminum.

The inlet port 198 has a diameter smaller than the diameter of the tubular portion 190 and is disposed within a first end of the tubular portion 190. The inlet port 198 is brazed or welded to the tubular portion 190, and is constructed from at least one of copper and aluminum.

The outlet port 200 has a diameter smaller than a diameter of the tubular portion 190 and is disposed within a second end of the tubular portion 190. The outlet port 200 is brazed or welded to the tubular portion 190, and is constructed from at least one of copper and aluminum.

Figure 7:
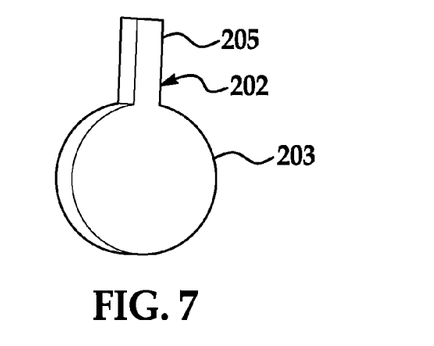
FIG. 7 is an enlarged schematic of a flow diverter utilized in the cooling fin of FIG. 3.
Figure 11:
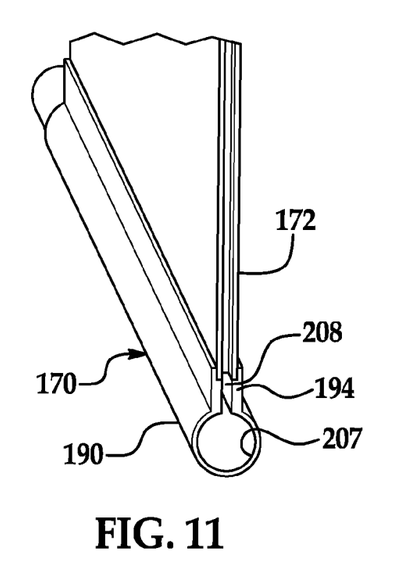
FIG. 11 is another enlarged schematic of an end portion of the cooling fin of FIG. 3 illustrating the first header and a portion of the extruded housing.
Figure 12:
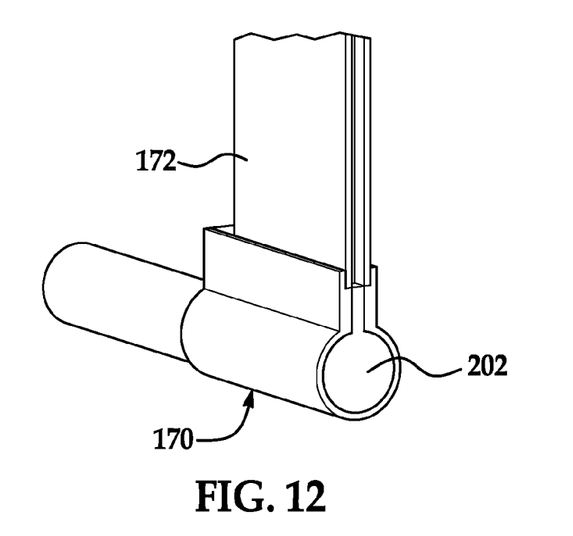
FIG. 12 is another schematic of an end portion of the cooling fin of FIG. 3 illustrating the first header and a portion of the extruded housing.

Referring to FIGS. 7, 11 and 12, the flow diverter 202 is configured be disposed inside the interior regions 207, 208 of the tubular portion 190 and the extension portion 194, respectively, at a predetermined position such that fluid flows from the header 170 through a first plurality of flow channels to the header 174. The flow diverter 202 includes a circular-shaped plate 203 coupled to a rectangular-shaped plate 205. In particular, the circular-shaped plate 203 is configured to be disposed within the interior region 207 of the tubular portion 190. The rectangular-shaped plate 205 is configured to be disposed within the interior region 208 of the extension portion 194. Further, the flow diverter 202 is constructed from at least one of copper and aluminum.

Referring to FIGS. 5, 8, 9 and 11, the extruded housing 172 is provided to allow fluid to flow therethrough between the headers 170, 174 to remove heat energy from adjacent battery cells. The extruded housing 172 is a generally rectangular-shaped plate having a plurality of flow channels 220, 222, 224, 226, 228, 230, 232, 234, 236, 238, 240, 242, 244, 246, 248, 250, 252, 254, 256, 258, 260, 262, 264, 266, 268, 270, 272, 274, 276, 278, 280, 282, 284, 286, 288, 290, 292 extending therethrough. Further, an end of the extruded housing 172 is configured to disposed within a portion of the extension portion 194 of the header 170, such that a first end of the flow channels fluidly communicate with the interior regions 207, 208 of the header 170. The extruded housing 172 is constructed from at least one of copper and aluminum, and is brazed or welded to the extension portion 194.

Figure 9:
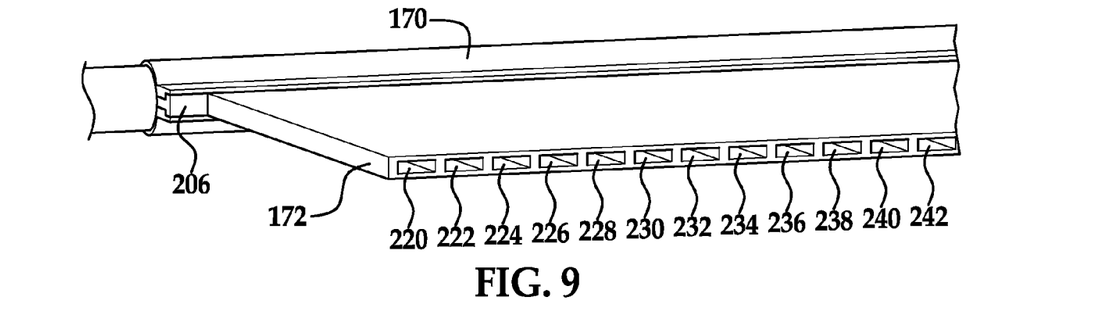
FIG. 9 is an enlarged schematic of an end portion of the cooling fin of FIG. 3 illustrating the first header and a portion of an extruded housing.
Figure 10:
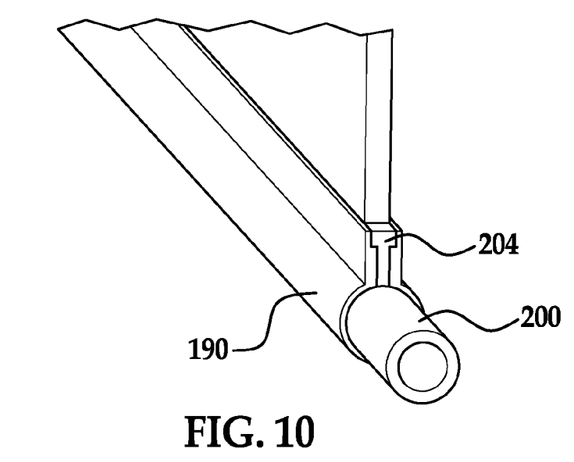
FIG. 10 is an enlarged schematic of an end portion of the cooling fin of FIG. 3 illustrating the first header and a portion of the extruded housing.

Referring to FIGS. 9 and 10, the plugs 204, 206 are configured to be disposed at first and second ends, respectively, of the header 170 in the interior region 208 of the extension portion 194 to seal an end portion of the extension portion 194. Further, the plugs 204, 206 are disposed on opposite sides of the extruded housing 172 in the interior region 208. The plugs 204, 206 are constructed from at least one of copper and aluminum, and are brazed or welded to the extension portion 194.

Figure 13:
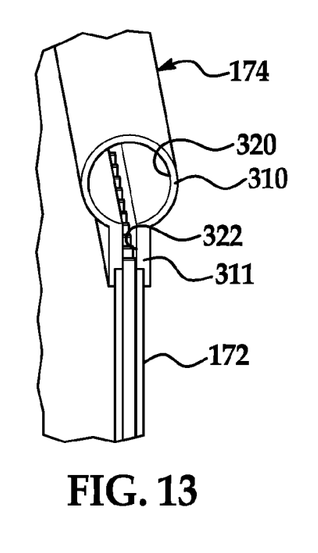
FIG. 13 is an enlarged schematic of an end portion of the cooling fin of FIG. 3 illustrating a second header and a portion of the extruded housing.
Figure 14:
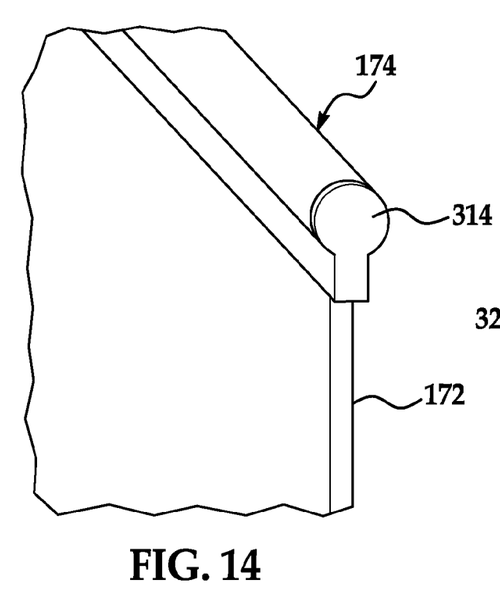
FIG. 14 is a schematic of an end portion of the cooling fin of FIG. 3 illustrating the second header and a portion of the extruded housing.

Referring to FIGS. 5, 13 and 14, the header 174 includes a tubular portion 310, an extension portion 311, and end caps 312, 314.

The tubular portion 310 includes an interior region 320 extending therethrough, and the extension portion 311 includes an interior region 322 extending therethrough. The extension portion 311 is coupled to the tubular portion 310 and has a substantially similar length as the tubular portion 310. Further, the interior region 320 of the tubular portion 310 communicates with the interior region 322 of the extension portion 311. Further, the tubular portion 310 and the extension portion 311 are constructed from at least one of copper and aluminum. The rectangular-shaped plate 205 of the extruded housing 172 is configured to be disposed at a second end within the interior region 322 of the extension portion 311, such that the flow channels 220, 222, 224, 226, 228, 230, 232, 234, 236, 238, 240, 242, 244, 246, 248, 250, 252, 254, 256, 258, 260, 262, 264, 266, 268, 270, 272, 274, 276, 278, 280, 282, 284, 286, 288, 290, 292 of the extruded housing 172 fluidly communicate with the interior regions 322, 320.

Figure 15:
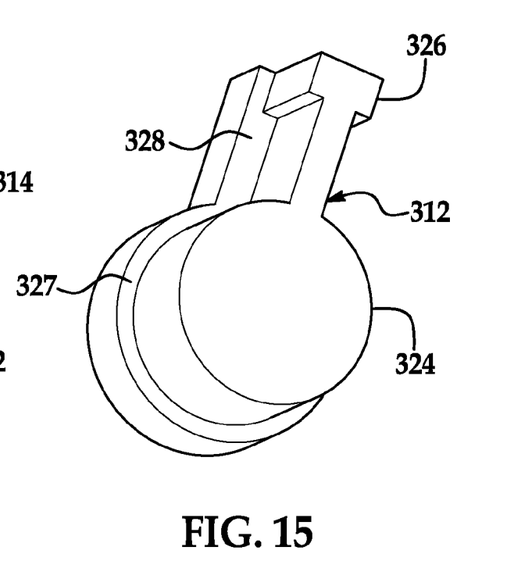
FIG. 15 is a schematic of an end cap member utilized in the second header.

The end caps 312, 314 are configured to be coupled to first and second ends, respectively, of the tubular portion 310 and the extension portion 311 to seal the first and second ends of the header 174. The end caps 312, 314 are constructed from at least one of copper and aluminum, and are brazed or welded to the tubular portion 310 and the extension portion 311. The configuration of the end caps 312, 314 are identical to one another. Accordingly, only the structure of the end cap 312 will be described in greater detail below. Referring to FIG. 15, the end cap 312 includes an inner circular-shaped portion 324 coupled to an inner T-shaped portion 326. The inner circular-shaped portion 324 and the inner T-shaped 326 are configured to be disposed in the interior regions 320, 322, respectively to seal one end of the header 174. The end cap 312 further includes an outer circular-shaped portion 327 and an outer rectangular-shaped portion 328 coupled to the inner circular-shaped portion 324 and the inner T-shaped portion 326, respectively. The outer circular-shaped portion 327 and the outer rectangular-shaped portion 328 are brazed or welded to an end of the tubular portion 310 and the extension portion 311.

Figure 8:
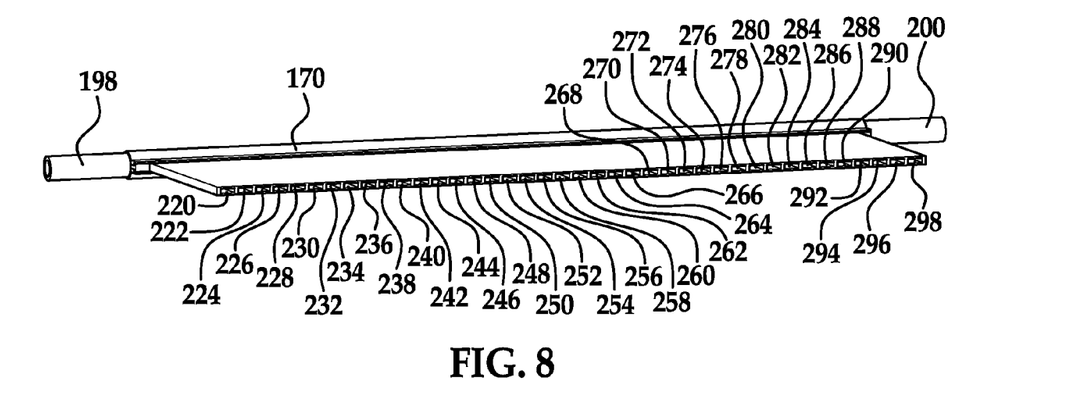
FIG. 8 is a cross-sectional schematic of a portion of the cooling fin of FIG. 3.

Referring to FIGS. 5 and 8, during operation, in one exemplary embodiment, fluid is received into the inlet port 198 of the header 170 and is routed to a first plurality of flow channels including flow channels 220, 222, 224, 226, 228, 230, 232, 234, 236, 238, 240, 242, 244, 246, 248, 250, 252, 254, 256, 258, 260, 262, 264, 266, 268, 270, 272, 274 of the extruded housing 172 when the flow diverter 202 is disposed in the header 170 proximate to the flow channel 274. Then, the fluid flows through the first plurality of flow channels to the interior regions 320, 322 of the header 174 and extracts heat energy from the cooling fin and the adjacent battery cells into the fluid. Then, the fluid is routed through the header 174 and further through a second plurality of flow channels 276, 278, 280, 282, 284, 286, 288, 290 and 292 back to the header 170 that further extracts heat energy from the cooling fin and battery cells. Thereafter, the fluid is routed out of the outlet port 200. It should be noted that a number of flow channels in the first plurality of flow channels is greater than a number of flow channels in the second plurality of flow channels The cooling fins 90, 92, 94, 96, 98, 100, 102, 104, 106, 108, 110 and 112 maintain the battery cells within a desired temperature range, and in particular can maintain the battery cells at a temperature less than a threshold temperature level. In one exemplary embodiment, the desired temperature range is 15° Celsius –35° Celsius. In another exemplary embodiment, the threshold temperature level is 40° Celsius.

Referring again to FIG. 1, in one exemplary embodiment, the compressor 22 is configured to pump a refrigerant through the conduit 28 into inlet ports of the battery module 20 in response to a control signal from the microprocessor 40. The conduit 30 is also fluidly coupled to outlet ports of the battery module 20. The conduit 30 receives refrigerant from the outlet ports and routes the refrigerant to the condenser 24.

The condenser 24 is provided to extract heat energy from the refrigerant flowing therethrough to cool the refrigerant. As shown, a conduit 32 is fluidly coupled between the condenser 24 and the compressor 22. After exiting the condenser 24, the refrigerant is pumped through the conduit 32 to the compressor 22.

The temperature sensor 36 is provided to generate a signal indicative of a temperature level of the battery cells disposed in the housing 60 that is received by the microprocessor 40.

The fan 38 is provided to urge air past the condenser 24 to cool the condenser 24 in response to a control signal from the microprocessor 40. As shown, the fan 38 is disposed proximate to the condenser 24.

The microprocessor 40 is provided to control operation of the battery system 10. In particular, the microprocessor 40 is configured to generate a control signal for inducing the compressor 22 to pump refrigerant through the battery module 20 when the signal from the temperature sensor 36 indicates a temperature level of the battery cells is greater than a predetermined temperature level. Further, the microprocessor 40 is configured to generate another control signal for inducing the fan 38 to blow air across the condenser 24 when the signal from the temperature sensor 36 indicates the temperature level of the battery cells is greater than the predetermined temperature level.

Figure 16:
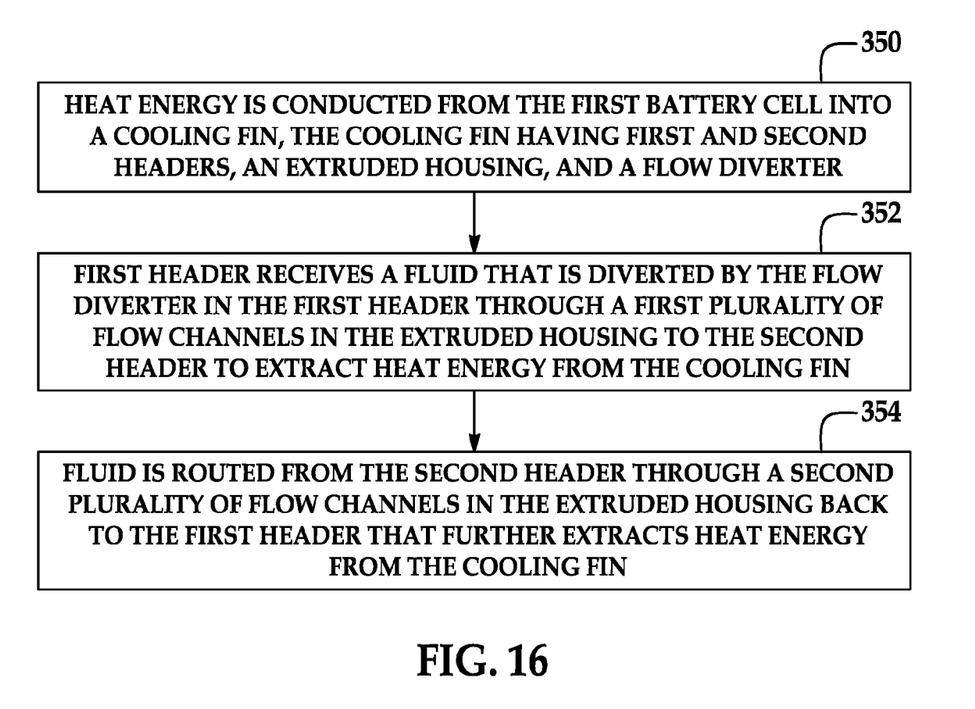
FIG. 16 is a flowchart of a method for cooling a battery module in accordance with another exemplary embodiment.

Referring to FIG. 16, a flowchart of a method for cooling the battery module 20 having a battery cell will now be explained. For purposes of simplicity, only one battery cell and one cooling fin will be described.

At step 350, heat energy is conducted from the battery cell 60 into the cooling fin 90. The cooling fin 90 has headers 170, 174, the extruded housing 172, and the flow diverter 202.

At step 352, the header 170 receives a fluid that is diverted by the flow diverter 202 in the header 170 through a first plurality of flow channels in the extruded housing 172 to the header 174 to extract heat energy from the cooling fin 90.

At step 354, the fluid is routed from the header 174 through a second plurality of flow channels in the extruded housing 172 back to the header 170 that further extracts heat energy from the cooling fin 90.

Figure 17:
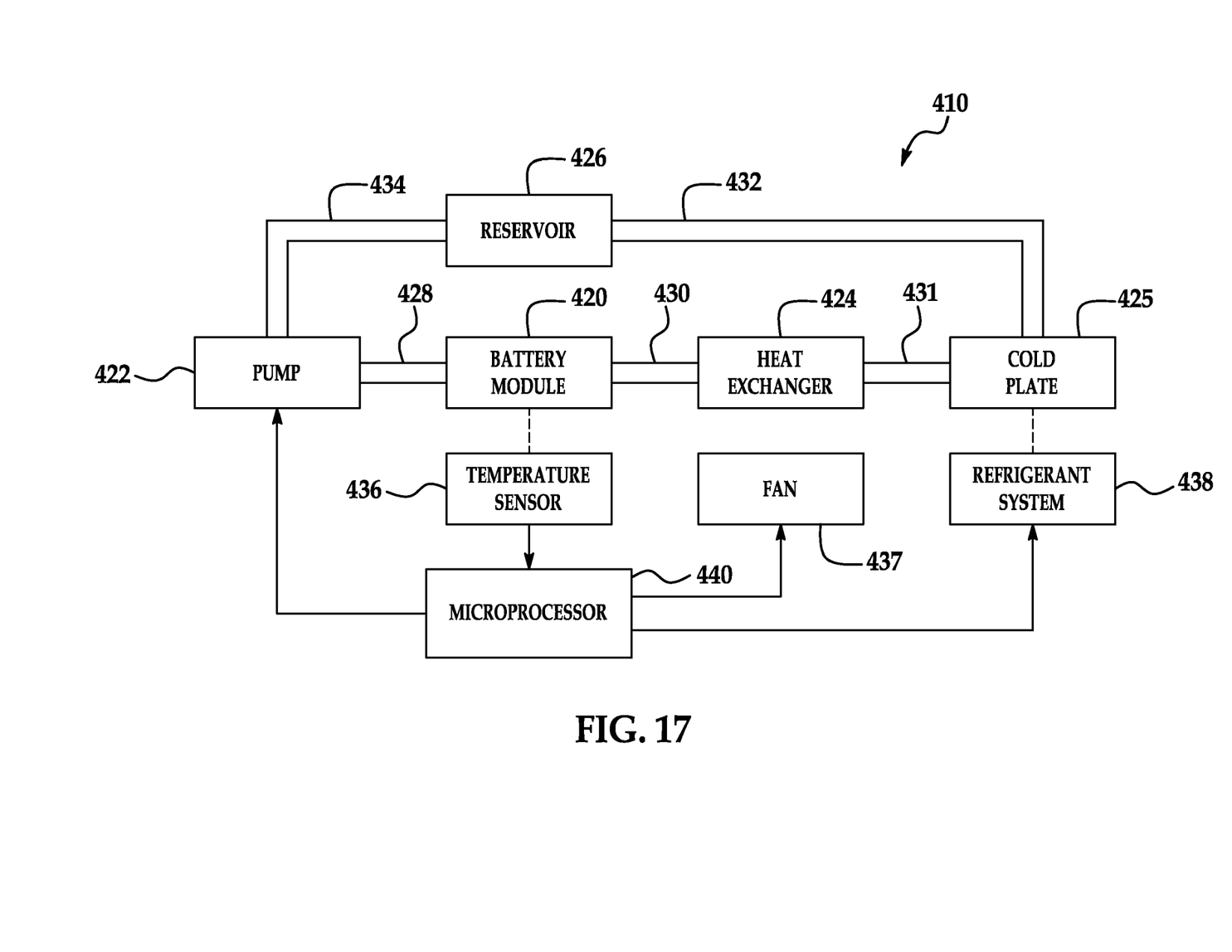
FIG. 17 is a schematic of another battery system in accordance with another exemplary embodiment.

Referring to FIG. 17, a battery system 410 for generating electrical power in accordance with another exemplary embodiment is illustrated. The battery system 410 includes a battery module 420, a pump 422, a heat exchanger 424, a cold plate 425, a reservoir 426, conduits 428, 430, 431, 432, 434, a temperature sensor 436, a fan 437, a refrigerant system 438, and a microprocessor 440. The primary difference between the battery system 410 and the battery system 10 is that the battery system 410 utilizes a coolant instead of a refrigerant to cool the battery module 420.

The battery module 420 has an identical structure as the battery module 20 discussed above.

The pump 422 is configured to pump a coolant through the conduit 428 into inlet ports of the battery module 420 in response to a control signal from the microprocessor 440. As shown, the conduit 428 is fluidly coupled between the pump 422 and the battery module 420, and the conduit 430 is fluidly coupled between the battery module 420 and the heat exchanger 424. After exiting the outlet ports of the battery module 420, the coolant is pumped through the conduit 430 to the heat exchanger 424.

The heat exchanger 424 is provided to extract heat energy from the coolant flowing therethrough to cool the coolant. As shown, a conduit 431 is fluidly coupled between the heat exchanger 424 and the cold plate 425. After exiting the heat exchanger 424, the coolant is pumped through the conduit 431 to the cold plate 425.

The fan 437 is provided to urge air past the heat exchanger 424 to cool the heat exchanger 424 in response to a control signal from the microprocessor 440. As shown, the fan 437 is disposed proximate to the heat exchanger 424.

The cold plate 425 is provided to extract heat energy from the coolant flowing therethrough to further cool the coolant. As shown, a conduit 422 is fluidly coupled between the cold plate 425 and the reservoir 426. After exiting the cold plate 425, the coolant is pumped through the conduit 432 to the reservoir 426.

The reservoir 426 is provided to store at least a portion of the coolant therein. As shown, a conduit 434 is fluidly coupled between the reservoir 426 and the pump 422. After exiting the reservoir 426, the coolant is pumped through the conduit 434 to the pump 422.

The temperature sensor 436 is provided to generate a signal indicative of a temperature level of at least one of the battery cells in the battery module 420, that is received by the microprocessor 440.

The refrigerant system 438 is provided to cool the heat exchanger 424 in response to a control signal from the microprocessor 440. As shown, the refrigerant system 438 is operably coupled to the cold plate 425.

The microprocessor 440 is provided to control operation of the battery system 410. In particular, the microprocessor 440 is configured to generate a control signal for inducing the pump 422 to pump refrigerant through the battery module 420 when the signal from the temperature sensor 436 indicates a temperature level of at least one of the battery cells is greater than a predetermined temperature level. Further, the microprocessor 440 is configured to generate another control signal for inducing the fan 437 to blow air across the heat exchanger 424 when the signal from the temperature sensor 436 indicates the temperature level of at least one of the battery cells is greater than the predetermined temperature level. Further, the microprocessor 440 is configured to generate another control signal for inducing the refrigerant system 438 to cool the cold plate 425 when the signal from the temperature sensor 436 indicates the temperature level of at least one of the battery cells is greater than the predetermined temperature level.

The battery module and the method for cooling the battery module provide a substantial advantage over other modules and methods. In particular, the battery module and the method provide a technical effect of cooling a battery cell in the battery module utilizing a cooling fin with an extruded manifold which can be easily assembled and manufactured.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

What is claimed is:

1. A battery module, comprising:
   a first battery cell; and
   a cooling fin disposed adjacent to the first battery cell, the cooling fin having first and second headers, an extruded housing, and a flow diverter;
   the first and second headers coupled to first and second ends, respectively, of the extruded housing; the first header having a first tubular portion, a first inlet port, and a first outlet port; the first inlet port and the first outlet port being coupled to opposite ends of the first tubular portion; the second header having a second tubular portion and first and second end caps disposed on opposite ends of the second tubular portion;
   the extruded housing having a generally rectangular-shaped plate with a first plurality of flow channels and a second plurality of flow channels extending therethrough that fluidly communicate with the first and second tubular portions, respectively, of the first and second headers, respectively;
   the flow diverter being disposed in the first tubular portion of the first header to induce a fluid to flow from the first tubular portion through the first plurality of flow channels in the extruded housing to the second tubular portion of the second header to extract heat energy from the first battery cell, and then to induce the fluid to flow from the second tubular portion through the second plurality of flow channels in the extruded housing back to the first tubular portion of the first header to further extract heat energy from the first battery cell.

2. The battery module of claim 1, wherein the first and second headers are constructed of at least one of copper and aluminum.

3. The battery module of claim 1, wherein the extruded housing is constructed of at least one of copper and aluminum.

4. The battery module of claim 1, wherein a number of flow channels in the first plurality of flow channels is greater than a number of flow channels in the second plurality of flow channels.

5. The battery module of claim 1, wherein the fluid is a coolant.

6. The battery module of claim 5, wherein the coolant comprises at least one of ethylene glycol and propylene glycol.

7. The battery module of claim 1, further comprising a second battery cell disposed adjacent to the cooling fin, such that the cooling fin is disposed between the first and second battery cells.

8. The battery module of claim 1, wherein the first header further includes a first extension portion coupled to the first tubular portion such that an interior region of the first extension portion communicates with an interior region of the first tubular portion.

9. The battery module of claim 8, wherein the first end of the extruded housing is configured to be disposed within a portion of the first extension portion such that a first end of the first plurality of flow channels fluidly communicate with the interior region of the first extension portion and the interior region of the first tubular portion.

10. The battery module of claim 9, wherein the second header further includes a second extension portion coupled to the second tubular portion such that an interior region of the second extension portion communicates with an interior region of the second tubular portion.

11. The battery module of claim 10, wherein the second end of the extruded housing is configured to be disposed within a portion of the second extension portion such that a second end of the first plurality of flow channels fluidly communicate with the interior region of the second extension portion and the interior region of the second tubular portion.

12. The battery module of claim 1, wherein the fluid is a refrigerant.

* * * * *